No. 890,421. PATENTED JUNE 9, 1908.
J. H. GROSS.
TROLLEY WHEEL SUPPORT.
APPLICATION FILED OCT. 10, 1906.
2 SHEETS—SHEET 2.
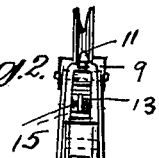
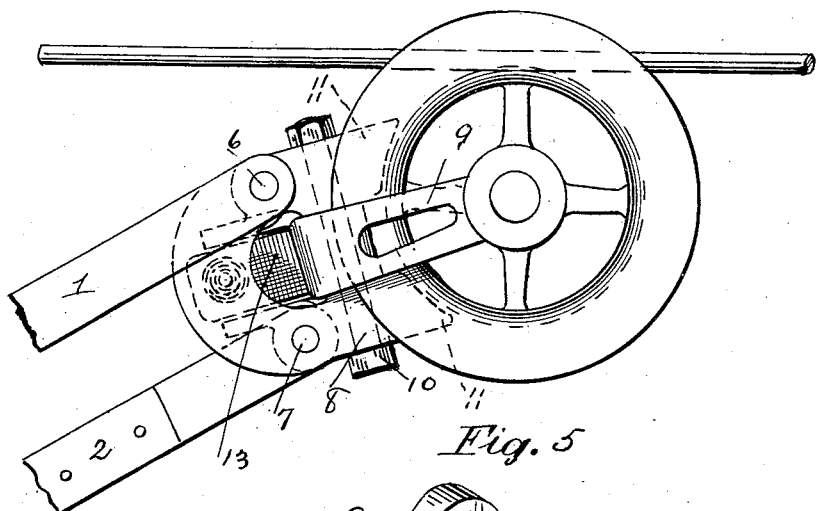
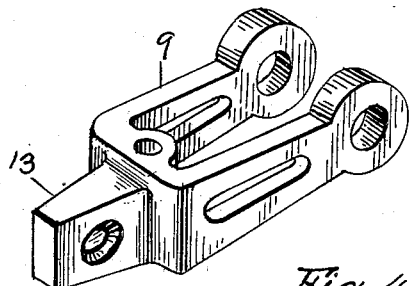
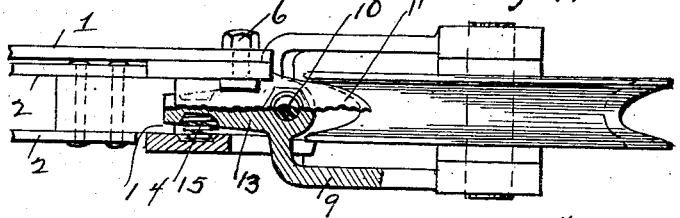
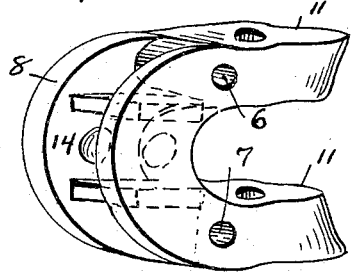

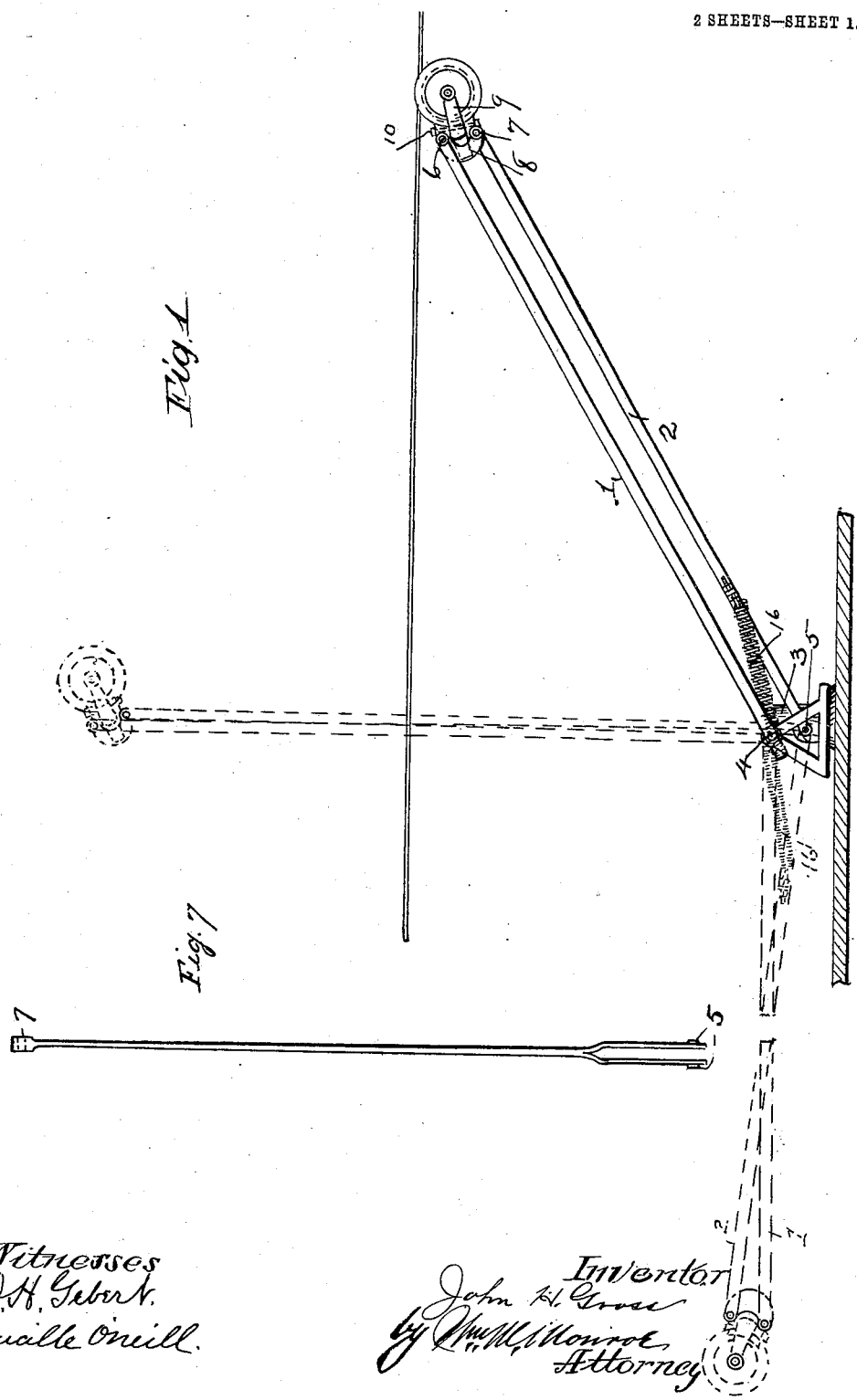

UNITED STATES PATENT OFFICE.

JOHN H. GROSS, OF NORWALK, OHIO.

TROLLEY-WHEEL SUPPORT.

No. 890,421.  Specification of Letters Patent.  Patented June 9, 1908.

Application filed October 10, 1906. Serial No. 338,201.

*To all whom it may concern:*

Be it known that I, JOHN H. GROSS, a citizen of the United States, and resident of Norwalk, county of Huron, State of Ohio, have invented certain new and useful Improvements in Trolley-Wheel Supports, of which I hereby declare the following to be a full, clear, and exact description, such as will enable others skilled in the art to which it appertains to make and use the same.

The objects of the invention are to provide a trolley wheel which will follow the irregularities in the curves taken by the trolley wire, and even a crooked trolley wire, and will maintain its position thereon and in close ccontact therewith irrespective of changes in the position of the trolley base relatively to the trolley wire.

The objects are further to provide a trolley pole head in which the harp is pivoted and to maintain in the pivotal axis a substantially vertical position so that the trolley wheel can swing with a lateral motion thereon to enable it to follow the curves of the wire.

A further object is to provide a trolley wheel support so constructed that there will be no obstruction to catch upon the cross or supporting wires for the trolley wire if the wheel should fly off the wire, when the car is going either backward or forward.

A further object is to give a slightly tilting movement to the wheel when going around curves, which also has a tendency to keep the wheel on the track.

To accomplish these objects the harp for the trolley wheel is pivotally mounted within a trolley head, and the head is supported in a duplex pole having parallel longitudinal members pivoted to bearings in the base at their lower ends, and to upper and lower bearings in the trolley head at their upper ends. The parallelism of these longitudinal members or bars which form the pole is constantly maintained, one set of bars folding within the other set when the pole is vertical, and hence the axial line of the harp pivot can always be retained at substantially the same position which is relatively vertical, so that the trolley wheel can swing laterally through the necessary arc to follow the wire resting in its groove however great the degree of curvature or irregularity in the direction taken by the wire.

The peculiar manner of mounting the harp and trolley head also tends to lower the wheel below the longitudinal center line of the pole, when the car is going forward so that it will not catch upon cross wires if suddenly thrown upward, and also tends to throw the wheel forward so that it will not catch upon cross wires when the pole is turned past the center as when backing up.

The invention consists in the pole composed of parallel members, the head pivoted thereon, the harp pivoted in the head and in the combination and arrangement of the several parts and construction of the details as hereinafter described, shown in the accompanying drawings, and specifically pointed out in the claims.

In the accompanying drawings, Figure 1 is a side elevation of a trolley pole showing the novel feature of this invention and showing in dotted lines the vertical and reversed positions of the pole; Fig. 2 is a rear elevation thereof; Fig. 3 is an enlarged side elevation of the trolley wheel, and the harp and supporting head therefor and the upper extremities of the pole members showing their parallel relation and the position of the harp pivot; Fig. 4 is a plan view thereof, a portion of the figure being broken away to show the equalizing spring in the head; Fig. 5 is a perspective view of the harp and Fig. 6 is a perspective view of the trolley head; Fig. 7 shows a single lower member for the trolley pole.

In these views 1 and 2 are respectively the upper and lower bars comprising the pole, which are respectively pivoted to the base 3 at their lower ends at 4 and 5, and are united at their upper ends by pivotal connections 6 and 7 with the trolley head 8.

It will be seen that the bars 2 are pivoted to the head 8 in such a manner as to fold within the bars 1 when the pole is raised, and thrown vertically as in the dotted positions shown in Fig. 1, which permits the pairs of bars to remain always parallel and hence their pivotal points 6 and 7 one above the other will always remain at the same angle to the horizontal.

The harp 9 is pivoted by means of pin 10 to the head which is provided with extremities 11 which project from the head, and enter the groove 12 in the trolley wheel far enough to prevent the trolley cord or other obstruction from entering therein. This pivotal pin 10 always lies upon a line parallel to the line connecting the pivotal points 6 and 7, so that since the bars 1 and 2 have a parallel movement the pin 10 will always remain at the same angle as the pole rises to the vertical position or through an arc of 90°.

A tongue 13 projects from the harp into an opening 14 in the trolley head, and flexible springs 15 at either side of the tongue restore the wheel to alinement when turned aside, so that when put upon the wire it will always be in line.

The actuating springs for the pole are shown in Figs. 1 and 2, here 16, 16 are the springs, which connect the extended lower extremities of the outer bars 1 below their pivotal points with the inner bars 2 above their pivotal points and hence exert a spring pressure upon the bars when the pole is lowered as seen in solid lines in Fig. 1. When the pole is in line with the pivots or just past the vertical position the springs have very little power, and when continued backward as seen at the left of the figure the pressure is small thus relieving the pressure and wear upon the base 3 and pivot pin and the peculiar action of the bars in crossing one another throws forward the wheel almost in line with the pole so that it can not catch upon the cross wires if suddenly released, and the spring pressure will not be sufficiently great to throw it violently upwards.

It will be seen that the pivotal points of the bars 1 and 2 with the base are not exactly over each other and that the line connecting these pivotal points at the base is parallel to the line connecting the pivotal points of the bars with the trolley head. The effect of this divergence from the exact vertical is to incline the axis of the harp when the wheel is traveling about a curve and thus incline the wheel to meet the curve in the manner of a bicycle upon a curve which will assist in maintaining the wheel in contact with the wire.

Other forms of detail construction of the device may be employed, without departing from the spirit of the invention, but I believe myself to be the first to employ, in a trolley pole, parallel longitudinal pole members, arranged to fold one within or by the side of the other, and to so pivot them upon the base and trolley head as to maintain the harp at a constant angle to the wire, and also to obtain the other features of efficiency hereinbefore described.

Having described the invention what I claim as new and desire to secure by Letters Patent is:

1. A trolley pole comprising a horizontally rotatable base, parallel longitudinal pole members pivoted thereto at their lower ends, a trolley head pivoted to the upper ends of said parallel pole members, the lines connecting the pivots in the head being parallel with the lines connecting the pivots in the base, one pole member being adapted to fold within the other and a trolley harp pivoted in said trolley head, the axis of said harp pivot being normally parallel with the lines connecting the pivots of the pole members in the base and head, and a spring tension device for the pole arranged to place the pole under greater tension when turned to run forward or backward than when reversed and not in use, substantially as described.

2. A trolley pole comprising a base, longitudinal parallel bars or pole members, pivotal connections for each pole member with said base, one set of pivots being above the other set, a trolley head, pivotal connections for each pole member therewith, the lines connecting the pivots of the adjacent pair of arms being parallel with the lines connecting the corresponding pivots thereof with the base, a trolley harp pivoted in the head for lateral movement, the pivotal axis thereof being parallel with the lines connecting the upper and lower pivotal points of the said parallel pole members, one of the said pole members being adapted to fold within the other member, and the said trolleys and harp being adapted to rise to approximately a vertical position when the pole members are pulled back of the vertical position, substantially as described.

3. A trolley pole comprising a base, a trolley head longitudinal parallel pole members pivoted in said base and head, the connecting lines between said pivots at head and base being parallel, a harp pivoted in said head for lateral movement and provided with a wheel, the pivotal axis of said harp being parallel to said lines connecting the pivotal points of said parallel pole members, a projecting tongue for said harp, equalizing springs for said tongue, and tension springs for said trolley pole arranged to give the maximum tension to the pole when the pole is in the inclined position going forward, but to have a reduced but positive tension thereon when the pole members are bent backward, substantially as described.

4. A trolley pole comprising a base, upper and lower parallel members pivoted thereto at their lower ends, the pivotal points for the upper member being above the pivotal points for the other member, a trolley head, pivotal points therein for said members arranged on parallel lines to lines connecting the pivotal points in the base, a trolley wheel and a harp pivoted in the head, the pivotal axis thereof being parallel to the lines connecting the pivotal points of the members in the head, a recess in the head, a tongue on the harp adapted to extend into said recess, equalizing springs between said tongue and head, and projecting parts of said trolley head adapted to enter the trolley wheel groove, substantially as described.

5. A trolley pole comprising a base, longitudinal parallel bars, pivoted thereto in upper and lower pole members, one member above the other, a trolley head pivotally secured to the upper end of said parallel members, the lines of said pivots being parallel to the lines of the pivots in the base, and the lower member adapted to fold within the upper member, a trolley harp and trolley pivoted for lateral movement in said head, extended lower extremities for the upper member, and springs connecting said lower extremities with the lower member at points upon the opposite side of the base, whereby the maximum tension is obtained when the pole is inclined for use, substantially as described.

6. A trolley pole comprising a base, a trolley head, upper and lower members pivoted thereto, at their respective ends for parallel longitudinal movement on each other as the pole is raised and adapted to fold within each other, a trolley and a harp pivoted in the head for lateral movement, the harp axis being inclined to the vertical the pivotal points of the respective members being out of a vertical line, whereby the trolley will be inclined when turned to meet a curve in the wire, substantially as described.

7. A trolley pole comprising, a base, a trolley head, parallel members pivoted to said head and base, the pivotal points of one member in head and base being located at a higher elevation than the pivotal points in the lower member, one member adapted to fold within the other and a harp pivoted for lateral movement in the head, the pivotal points of the respective members in the head and base being arranged in parallel lines, substantially as described.

8. A trolley pole, comprising a base, a pole body composed of parallel members, a head, the pivotal points of the parallel members with the head and base being higher in one member than in the other whereby one member is adapted to fold within the other, and tension springs, connecting the lower extremities of said pole members, the connecting points thereof with one member being above its lower pivotal point with the base and the connecting points thereof with the other member being below its pivotal point with the base, substantially as described.

JOHN H. GROSS.

Witnesses:
WM. M. MONROE,
A. H. GEBERT.